United States Patent
Jagtiani et al.

(10) Patent No.: US 10,372,696 B2
(45) Date of Patent: Aug. 6, 2019

(54) SYSTEM AND METHOD FOR MASSIVELY PARALLEL PROCESSING DATABASE

(71) Applicant: Futurewei Technologies, Inc., Plano, TX (US)

(72) Inventors: Kamini Jagtiani, Sunnyvale, CA (US); Gangavara Prasad Varakur, Danville, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1061 days.

(21) Appl. No.: 14/572,502

(22) Filed: Dec. 16, 2014

(65) Prior Publication Data

US 2016/0171072 A1 Jun. 16, 2016

(51) Int. Cl.
*G06F 16/00* (2019.01)
*G06F 7/00* (2006.01)
*G06F 16/22* (2019.01)
*G06F 16/27* (2019.01)

(52) U.S. Cl.
CPC ........ *G06F 16/2282* (2019.01); *G06F 16/273* (2019.01)

(58) Field of Classification Search
CPC ........... G06F 17/30; G06F 11/14; G06F 11/20
USPC ....................................................... 707/613
See application file for complete search history.

(56) References Cited

U.S. PATENT DOCUMENTS

| | | | |
|---|---|---|---|
| 6,725,750 B1 | 4/2004 | Feltch et al. | |
| 9,684,671 B1 * | 6/2017 | Dorin | H04L 67/1097 |
| 2004/0230862 A1 * | 11/2004 | Merchant | G06F 3/0607 714/6.12 |
| 2013/0124565 A1 | 5/2013 | Annapragada | |
| 2013/0262389 A1 * | 10/2013 | Rathof | G06F 11/1464 707/642 |
| 2014/0122484 A1 | 5/2014 | Jagtiani et al. | |
| 2014/0325182 A1 | 10/2014 | Varakur et al. | |

FOREIGN PATENT DOCUMENTS

| | | |
|---|---|---|
| CN | 103412897 A | 11/2013 |
| CN | 104135526 A | 11/2014 |
| WO | 2014173295 A2 | 10/2014 |

OTHER PUBLICATIONS

"Partitioned—Tales and Indexes", Jul. 13, 2013, XP055375543, Retrieved from the internet: URL:https://web.archive.org/web/20130713120951/https://docs.oracle.com/cd/B10500_01/server.920/a96524/c12parti.htm [retrieved on May 23, 2017] total 12 pages.

(Continued)

*Primary Examiner* — Usmaan Saeed
*Assistant Examiner* — Raquel Perez-Arroyo
(74) *Attorney, Agent, or Firm* — Slater Matsil, LLP

(57) ABSTRACT

In one embodiment, a method for adding partitions to a massively parallel processing (MPP) cluster includes determining whether a first number of available nodes of a first leaf sub-cluster (LSC) of a meta sub-cluster (MSC) of the MPP cluster is greater than or equal to a second number of partitions of a table and assigning a first node of the first LSC to a first partition when the first number of available nodes is greater than or equal to the second number of partitions. The method also includes searching for a second LSC in the MSC when the first number of available nodes is less than the second number of partitions.

20 Claims, 6 Drawing Sheets

(56) References Cited

OTHER PUBLICATIONS

"MySQL Cluster Nodes, Node Groups, Replicas,and Partitions", Jul. 3, 2014, XP055419052, Retrieved from the internet: URl: https://web.archive.org/web/20140703034302/https://dev.mysql.com/doc/refman/5.5/en/mysql-cluster-nodes-groups.html{retrieved on Dec. 7, 2017} total 4 pages.
Troy Frericks, "Partition (database)," Jul. 9, 2014, pp. 1-3.
George Eadon et aL, "Supporting Table Partitioning by Reference in Oracle," SIGMOD08, ACM, Jun. 9, 2008, pp. 1111-1122.
Ming Tang, et aL, "Dynamic Replication Algorithms for the Multi-tier Data Grid," Future Generation Computer Systems, vol. 21, No. 5, May 1, 2005, pp. 775-790.

\* cited by examiner

SYSTEM AND METHOD FOR MASSIVELY PARALLEL PROCESSING DATABASE

TECHNICAL FIELD

The present invention relates to a system and method for distributed processing and computing, and, in particular, to a system and method for a massively parallel processing database.

BACKGROUND

Massively parallel processing (MPP) is the coordinated processing of a program by multiple processors, with each processor working on different parts of the program. The processors communicate with one another to complete a task, with each of them using its own operating system and memory resources. MPP systems may be built to scale to a large number of data nodes.

In an MPP system, an administrator distributes data for distributed computing applications to a number of processors, called partitions or data nodes. For example, an MPP database system facilitates distributing database data to multiple data nodes for query processing in a parallel and distributed manner.

An MPP system may use a cluster subsystem as a foundation to provide high availability to the upper layer software programs, such as database/application servers or applications, running in a cluster environment. It is problematic to provide both scalability of the cluster, in terms of the number of nodes, and high availability. In one example, database clusters are flat, and hence support limited numbers of nodes. For examples, shared disk clusters may support up to 32 nodes, and shared nothing clusters support 128 nodes. Another example cluster scales well but has limited high availability because of loosely coupled high availability architecture. An additional example is more like multi-master client server high availability architecture, with limited high availability following max-quorum protocol on selected servers.

SUMMARY

An embodiment method for adding partitions to a massively parallel processing (MPP) cluster includes determining whether a first number of available nodes of a first leaf sub-cluster (LSC) of a meta sub-cluster (MSC) of the MPP cluster is greater than or equal to a second number of partitions of a table and assigning a first node of the first LSC to a first partition when the first number of available nodes is greater than or equal to the second number of partitions. The method also includes searching for a second LSC in the MSC when the first number of available nodes is less than the second number of partitions.

An embodiment method for performing replication in a massively parallel processing (MPP) cluster includes determining a replication type of a first partition on a first node on a first leaf sub-cluster (LSC) on a meta sub-cluster (MSC) of the MPP cluster and determining a first takeover LSC for the first LSC. The method also includes determining a first takeover node for the first node and performing replication of the first partition in accordance with the replication type, the first takeover node, and the first takeover LSC.

An embodiment method for removing a partition in a massively parallel processing (MPP) cluster includes locating a node on a leaf-sub cluster (LSC) on a meta sub-cluster, where the partition resides on the node and freeing the partition on the node. The method also includes updating a catalog to indicate that the partition has been dropped.

An embodiment computer includes a processor and a non-transitory computer readable storage medium storing programming for execution by the processor. The programming including instructions to determine whether a first number of available nodes of a first leaf sub-cluster (LSC) of a meta sub-cluster (MSC) of the MPP cluster is greater than or equal to a second number of partitions of a table and assign a first node of the first LSC to a first partition when the first number of available nodes is greater than or equal to the second number of partitions. The programming also includes instructions to search for a second LSC in the MSC when the first number of available nodes is less than the second number of partitions.

An embodiment computer includes a processor and a non-transitory computer readable storage medium storing programming for execution by the processor. The programming including instructions to determine a replication type of a first partition on a first node on a first leaf sub-cluster (LSC) on a meta sub-cluster (MSC) of the MPP cluster and determine a first takeover LSC for the first LSC. The programming also includes instructions to determine a first takeover node for the first node and perform replication of the first partition in accordance with the replication type, the first takeover node, and the first takeover LSC.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
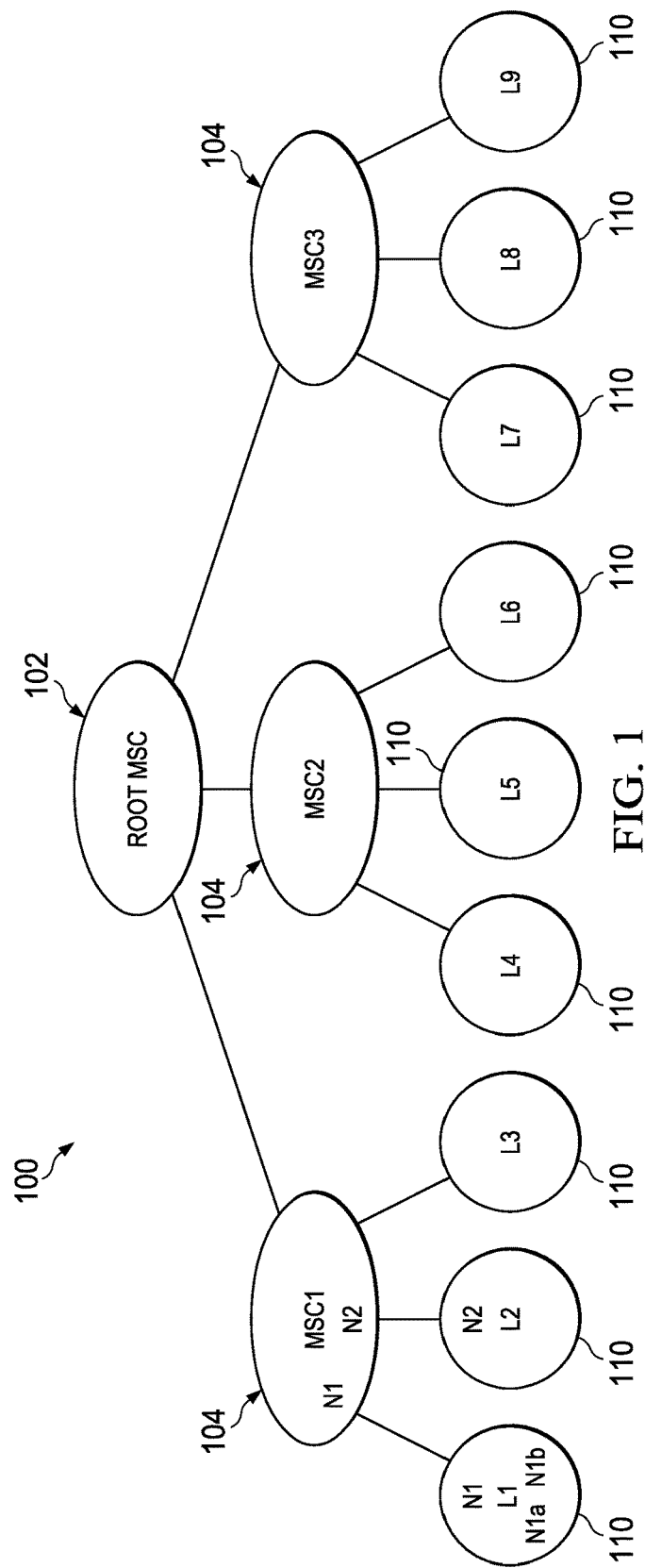
FIG. 1 illustrates an embodiment massively parallel processing (MPP) cluster topology.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments include methods of placing and managing database objects, such as partitions, indices, and replicas on a hierarchical cluster in a massively parallel processing (MPP) database. The placement and management of database objects is configurable to align with data access patterns and availability requirements. For example, for a table, partitions are split and located in the same sub-cluster. In another example, when there are two tables which are normally queried together, partitions of the two tables are co-located. In one example, replicas are kept in the same leaf sub-cluster (LFC) for synchronous replication. In another example with asynchronous or semi-synchronous replication, the replica is kept outside the LFC.

Some MPP database systems focus on analytical applications which have relatively low availability requirements and use simple data distribution models. Other MPP database systems extend the MPP architecture to support transaction processing applications and other applications with higher availability. High availability (HA) refers to a system's high resiliency and capability to handle failures or process faults with minimum down time and manual or administrative intervention to ensure that the overall system is operating properly. An MPP system includes a cluster subsystem as foundation to provide high availability to the upper layer software programs, such as database/application servers or applications, running in the cluster environment. Providing both scalability of the cluster, in terms of nodes, and HA is problematic. This may be addressed by favoring either HA or scalability.

For example, some MPP systems allow an administrator to create three types of HA clusters based on the expense of heart-beating in the cluster and its impact on scalability of the cluster. A heart-beat (HB) is the active messaging/probing among various cluster components and nodes to proactively discover faulty components, such as processors, nodes, storage, or network, in the MPP system. The three models of HA clusters may be executed by a component in the MPP system, such as a cluster membership layer (CML).

One HA cluster model is loosely coupled clusters. In this model, the CML is not defined, or has a substantially limited role, in maintaining the cluster. When the CML is not defined, the cluster is similar to a federated system, where all cluster nodes may not know about the existence of all the other nodes in the cluster. However, applications running on certain nodes may have knowledge of a subset of other nodes in the cluster, depending on the application's need to communicate or coordinate with these nodes. When the CML is defined, it may know about all the nodes in the cluster, but there is no active heart-beating. In both cases, because there is no HB, faulty components are discovered when an application on one node tries to access these components or nodes. In an example, no recovery is defined, and an error condition is raised to the administrator to recover and restore the MPP system's integrity. In some cases, the applications may implement ad-hoc recovery mechanisms specific to that application, for example for some error conditions. Because there is minimal CML overhead, this model provides a high degree of scalability.

Another HA cluster model is master-slave clusters. In this model, the cluster membership responsibility is assigned to one or two master nodes, and regular heart-beating takes place between master node(s) and slave nodes only. In such a system, slave nodes do not send any heart-beat messages among themselves, and only master nodes are involved in cluster membership decisions. This kind of cluster setup is scalable, because the heart-beating is limited to master-to-slave nodes. However, this model provides limited HA, because the existence of the whole cluster depends on one or two master node(s). Increasing the number of master nodes in the clusters does not solve the problem, because it hurts scalability and performance from the additional messaging introduced to keep the masters synchronized. This method provides relative high levels of HA, while retaining some cluster scalability.

A third HA model is tightly coupled clusters. In such clusters, all nodes are considered equal, and they all send heart-beat messages to each other to maintain the integrity of the cluster membership. Such a system has more messaging traffic within the cluster, and uses more complex algorithms to maintain the cluster integrity. This type of cluster provides a very high level of availability, but has limitations in scalability.

In one example, a highly scalable high availability cluster (HSHAC) is used, which provides HA to the cluster while facilitating scalability. Provisions may be integrated into a HSHAC with MPP applications, such as Database Management Systems. HSHAC may be used for shared disk, shared nothing, or hybrid architectures. The use of HSHAC may avoid a single point of failure (SPOF) of any component, which improves availability and reliability. HA is achieved, so the cluster will run be operational when there are at least one or a pre-determined minimum number of live node(s) in the cluster. However, the application may have reduced or limited performance and throughput when multiple nodes or components of the cluster fail. Another characteristic is high scalability in terms of cluster size, so clusters may be scaled to a large number of nodes while providing a high degree of HA. There may be a tradeoff between run-time performance and fault recovery.

Nodes in an HSHAC may be highly scalable by arranging nodes of the cluster in hierarchical structures. The cluster may be viewed as a collection of smaller tightly coupled sub-clusters. Being tightly clustered, each sub-cluster provides substantially or sufficiently high availability within the sub-cluster. Such a sub-cluster is referred to as a leaf sub-cluster, LSC, or leaf. A second layer of meta sub-clusters (MSCs) are superimposed on top of the leaf clusters to form intermediary nodes of the hierarchy. Such MSCs manage availability of leaves while limiting the heart-beat traffic to the respective sub-clusters.

The MSCs may form multiple layers of the hierarchy, with one root MSC at the top. The hierarchy is a balanced tree, where each tree-node depicts a sub-cluster. More of the cluster nodes may be in the LSCs, and a smaller number of nodes may fall into the MSCs at various levels. FIG. 1 illustrates cluster topology 100 with a sub-cluster hierarchy. The topology represents a tree with a fan-out of three, which supports a 27 node cluster. Each tree node or sub-cluster may have 32 data or processing nodes or components in a tightly coupled cluster model. The tree has a height of three, where the first level is root MSC 102, second level 104 with three MSCs (MSC1, MSC2, and MSC3) coupled to root MSC 102. A third level includes LSCs or leaves 110 (L1, L2, L3, L4, L5, L6, L7, L8, and L9) coupled to second level 104. This tree may host 32×32=1024 nodes at each MSC and may scale to 32×32×32=32,768 nodes. In another embodiment, the tree may have a different height, for example with more than one level of MSCs between the root MSC and the LSCs. A cluster with a height of four may scale to more than one million nodes. Additional details of an HSHAC are included in U.S. patent application Ser. No. 13/871,276 filed on Apr. 26, 2013, which application is hereby incorporated herein by reference.

A cluster with cluster topology 100 may achieve high availability by configuring a degree of high availability. This HA degree is defined as the maximum number of sub-clusters or tree-node of which a particular data or processing node is a member. The HA degree reflects the resiliency of the cluster to multiple simultaneous faults in the cluster. Increasing the HA degree increases the copies of the cluster membership information maintained in the cluster. However, this may affect or reduce the runtime performance. A node in the LSC belongs only to that sub-cluster. A node in the MSC has a minimum HA degree of two. This means that the node in the MSC belongs to at least two sub-clusters including that MSC. A node belonging to or connecting two sub-clusters is referred to as a connector node. For example, the entire cluster with topology 100 has a HA degree of two, because any connector node is part of two sub-clusters at a maximum.

The HA in each sub-cluster is achieved by tight monitoring via heart beating of all nodes in that sub-cluster. The heart-beat message exchange is limited between the nodes within each of the sub-clusters and prevented from reaching nodes in other sub-clusters. Limiting the heart-beat traffic to within sub-clusters improves the scalability of the system. When a node crash is identified or detected, other nodes in the sub-cluster recover with a sufficiently fast response time to a new membership and remove the crashed node from that sub-cluster. For example, the sub-cluster L1 of cluster topology 100 includes nodes N1, N1a and N1b. When node N1a crashes, the membership layer of L1 discovers the crash and recovers the situation by forming a new sub-cluster L1 with nodes N1 and N1b, and removing node N1a from L1. More involved membership maintenance mechanisms may be used when the crashed nodes are connector nodes or multiple nodes simultaneously crash.

To efficiently manage the cluster membership in a relatively large scale cluster, the cluster may be divided into smaller sub-clusters for independent CML messaging. This facilitates that the heart-beating and membership management overhead are localized within the sub-clusters. Token ring based heart-beat messaging may be used, such as according to a Totem protocol. In other embodiments, this HB may be replaced by another algorithm, such as all-peers messaging, where each node sends and receives HB messages to and from every other node in the sub-cluster.

The nodes in the cluster may be leaf nodes or connector nodes. A leaf node is a node which is a member of only a single sub-cluster. By definition, the HA of a leaf node is one. The leaf nodes are at the bottom layer or level of the tree hierarchy, and are part of the LSCs. However, leaf nodes may exist at any higher level of sub-cluster. A connector node is a node which is a member of two or more sub-clusters, depending on the HA degree of the cluster. Connector nodes join two or more sub-clusters and provide HA to all the connected sub-clusters using a lightweight membership protocol. One of the sub-clusters is designated as a home cluster for the connector node. When the connector node fails, one of the peers in its home cluster may take the responsibility to find a replacement of the connector node.

In a tightly coupled sub-cluster, a leaf node has the ability to cover or take over responsibilities of any other leaf node in the sub-cluster when faults or crashes occur. The leaf node may also be covered by any other leaf in the sub-cluster. The connector node covers any node of its sub-clusters, and is covered by any peer node in its home cluster. Further, a node may be promoted to the capability to cover or take over a crashed node. Nodes which may be promoted are either leaf nodes in an LSC with an HA degree of one or a node in an MSC with an HA degree less than that of the entire cluster (the maximum HA degree of all the sub-clusters). The maximum HA degrees may also be configurable at the time of cluster creation.

Figure 2:
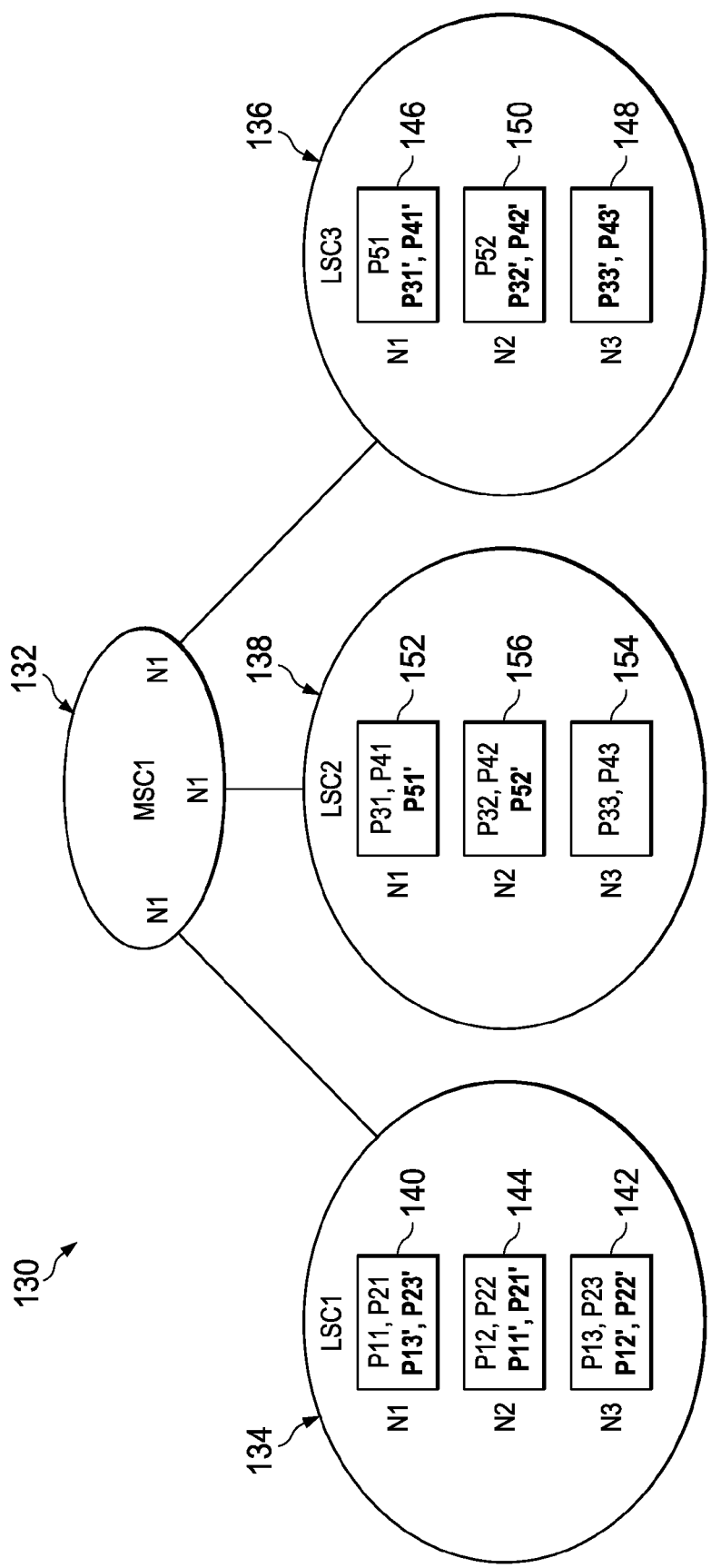
FIG. 2 illustrates partition and replica placement in an embodiment MPP cluster topology.

FIG. 2 illustrates the placement of partitions in sub-cluster 130, which contains MSC 132 and LSCs 134, 136, and 138. Table T1 with customer information, including social security number (SSN), first name, and second name, is partitioned and synchronously replicated on LSC 134 on nodes 140, 142, and 144. In synchronous replication, replicas are placed on other nodes in the same LSC. Also, in synchronous replication changes are applied to together, synchronously. Table T1 is partitioned by social security number into three partitions, P11, P12, and P13, where P11 is on node 140, P12 is on node 144, and P13 is on node 142. Replicas P11', P12', and P13' are on nodes 142, 144, and 140 in LSC 134, respectively. Also, table T2, with account information, including account number, social security number, type, and balance, is synchronously partitioned on LSC 134 based on account number, and also by social security number. Partitions P21, P22, and P23 are on nodes 140, 144, and 142, respectively, while replicas P21', P22', and P23' are on nodes 144, 142, and 140, respectively. The first name, last name, account number, and balance are selected when customer.ssn=account.ssn.

Tables T3, T4, and T5 are partitioned and asynchronously replicated in LSCs 138 and 136. In asynchronous replication, replicas are on different LSCs in the same MSC, and changes are applied asynchronously. Table T3 has customer information, including social security number, first name, and last name, table T4 has account information, including account number, social security number, type, and balance, and table 5 has region information, including state, city, and zip code. Table 3 has partitions P31, P32, and P33, which are in LSC 138 on nodes 152, 156, and 154, respectively, while replicas P31', P32', and P33' are in LSC 136 on nodes 146, 150, and 148, respectively. Similarly, table 4 has partitions P41, P42, and P43 in LSC 138 on nodes 152, 156, and 154, respectively, while replicas P41', P42', and P43' are on LSC 136 on nodes 146, 150, and 148, respectively. Also, table 5 has partitions P51 and P52 on LSC 136 on nodes 146 and 150, respectively, while replicas P51' and P52' are on nodes 152 and 156, respectively, on LSC 138.

Figure 3:
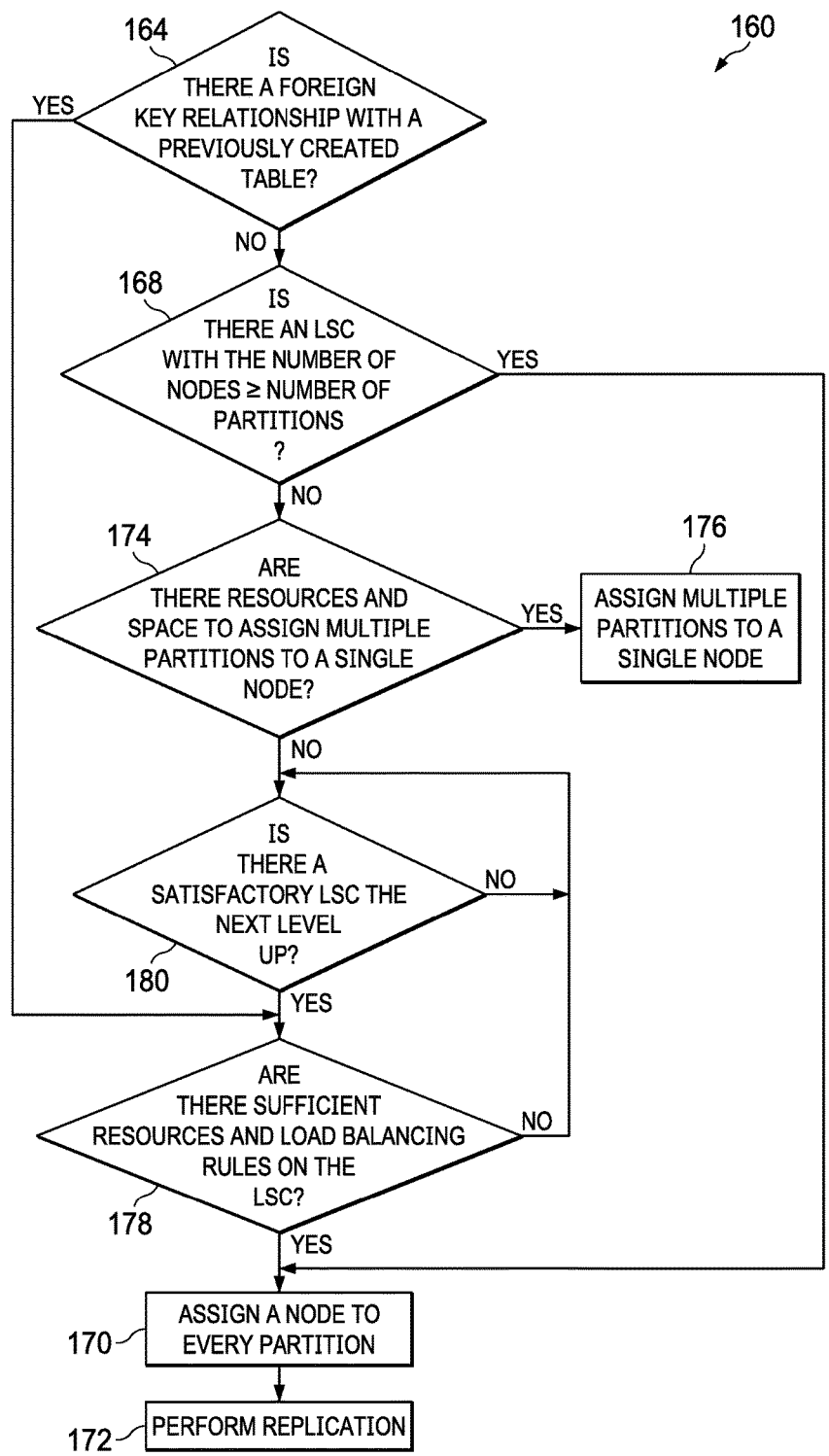
FIG. 3 illustrates a flowchart for an embodiment method of creating a table in an MPP database.

FIG. 3 illustrates flowchart 160 for a method of creating and placing a new table in an MPP database. Initially, in step 164, the system determines whether there is a foreign key relationship between the table to be added and a previously created table. A foreign key is a field or collection of fields in one table which uniquely identifies a row of another table. When there is such a foreign key relationship, it is desirable to keep the partition together with the foreign key. When there is a foreign key relationship, the system proceeds to step 178, and when there is not a foreign key relationship, the system proceeds to step 168.

In step 168, the system determines whether there is an LSC where the number of available nodes is greater than or equal to the number of partitions of the table to be added. It is desirable for the number of nodes in the LSC be greater than or equal to the number of partitions to balance user resources and place all the partitions on separate nodes of the same LSC. When there is an LSC with the number of available nodes greater than the number of partitions, that LSC is selected, and the system proceeds to step 170. On the other hand, when there is not such an LSC, the system proceeds to step 174.

In step 170, the system assigns a different node to each partition in the selected LSC.

Next, in step 172, the system performs replication. The same data is stored on different nodes for consistency between redundant resources. The replication may be synchronous replication, asynchronous replication, or semi-synchronous replication. In synchronous replication, replicas are placed on different nodes within the same LSC, while in asynchronous replication, replicas are placed on nodes of a different LSC. In semi-synchronous replication, some replicas are placed on nodes of the same LSC and some replicas are placed on nodes of another LSC.

In step 174, the system determines whether there are sufficient resources and space to assign multiple partitions to a single node in the LSC. When there are sufficient resources, the system proceeds to step 176, and assigns multiple partitions to a single node in the LSC. When there are not sufficient resources, the system proceeds to step 180.

In step 180, the system traverses up to the next level to find a satisfactory LSC. For example, the system looks at the parent MSC and looks for another LSC in the same MSC. When there is not another LSC in the parent MSC, the system, goes up another level to find an LSC in another MSC. The system attempts to find an LSC with the minimum distance from the original LSC. When the system finds a satisfactory LSC, it proceeds to step 178.

In step 178, the system determines whether there are sufficient resources and load balancing rules on the LSC. The LSC may be the LSC of a previously created table, or an LSC as close as possible to the previously created table. When there are sufficient resources, the system selects the LSC, and proceeds to step 170 to assign nodes of the LSC to the partitions of the table. When there are not sufficient resources, the system proceeds to step 180 to find another LSC.

Figure 4:
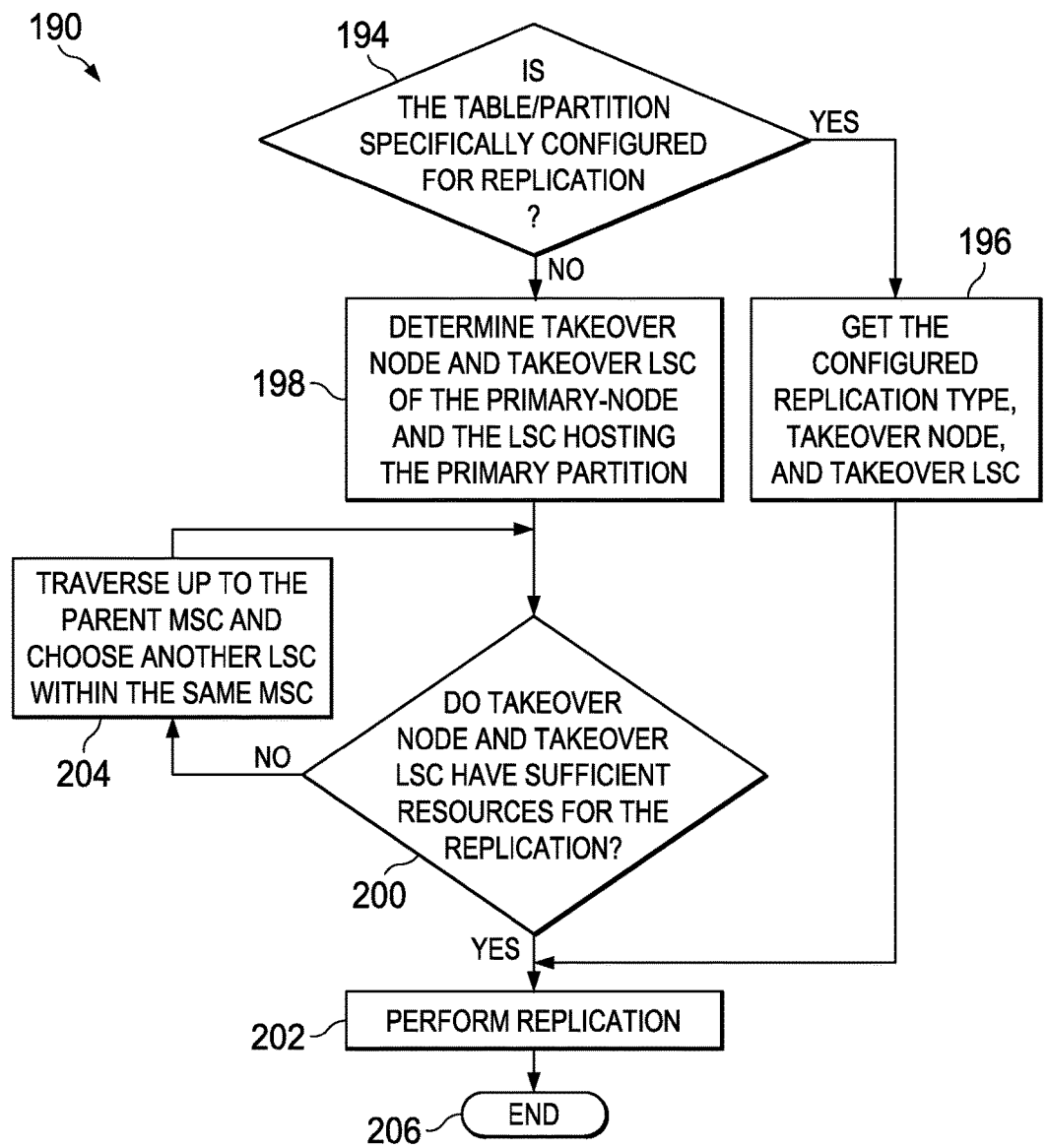
FIG. 4 illustrates a flowchart for an embodiment method of replicating a table or partition in an MPP database.

FIG. 4 illustrates flowchart 190 for a method of performing replication in an MPP database. For example, flowchart 190 may be used for step 172 in flowchart 160. Initially, in step 194, the system determines whether the table or partition to be replicated is configured specifically for replication. When the table or partition is configured specifically for replication, the system proceeds to step 196. When the table or partition is not configured specifically for replication, the system proceeds to step 198.

In step 196, the system determines the configured replication type, the takeover node and, takeover LSC for the table or partition. The replication type may be synchronous, asynchronous, or semi-synchronous. In synchronous replication, the replicas are close to the partitions, in the same LSC, and changes are applied together. In asynchronous replication, replicas are on different LSCs in the same MSC, and changes are applied asynchronously. In semi-synchronous replication, some replicas are in the same LSC, and some replicas are in different LSCs. Also, the system determines the takeover node and takeover LSC. The takeover node will take over for the current node in the case of a failure or fault, and the takeover LSC will take over for the current LSC.

Next, in step 202, the system performs replication. The replicas are synchronous, asynchronous, or semi-synchronous based on the decision in step 196. In asynchronous replication, replicas are placed on nodes of another LSC, in synchronous replication, replicas are placed on nodes of the same LSC, and in semi-synchronous replication, some replicas are placed on nodes of the same LSC and some replicas are placed on nodes of another LSC. After the replicas are set up, the system proceeds to end 206.

In step 198, the system determines the takeover node and takeover LSC of the primary node and primary LSC hosting the primary partition. The system also determines the replication type. The replication type may be synchronous, asynchronous, or semi-synchronous. In synchronous replication, the replicas are on nodes close to the partitions, in the same LSC, and changes are applied together. In asynchronous replication, replicas are on nodes of different LSCs in the same MSC, and changes are applied asynchronously. In semi-synchronous replication some replicas are on nodes on the same LSC, and some replicas are on nodes of different LSCs.

Then, in step 200, the system determines whether the takeover node and takeover LSC have sufficient resources for the replication type based on specified load balancing rules. When the takeover node and takeover LSC have sufficient resources, the system proceeds to step 202 to set up the replication. When there are not sufficient resources, the system proceeds to step 204 to look for another LSC with sufficient resources.

In step 204, the system looks for an LSC with sufficient resources for replication. The system traverses up to the parent MSC and chooses another LSC within the same MSC. Then, the system returns to step 200 to determine if the takeover node and takeover LSC have sufficient resources for the replication.

Figure 5:
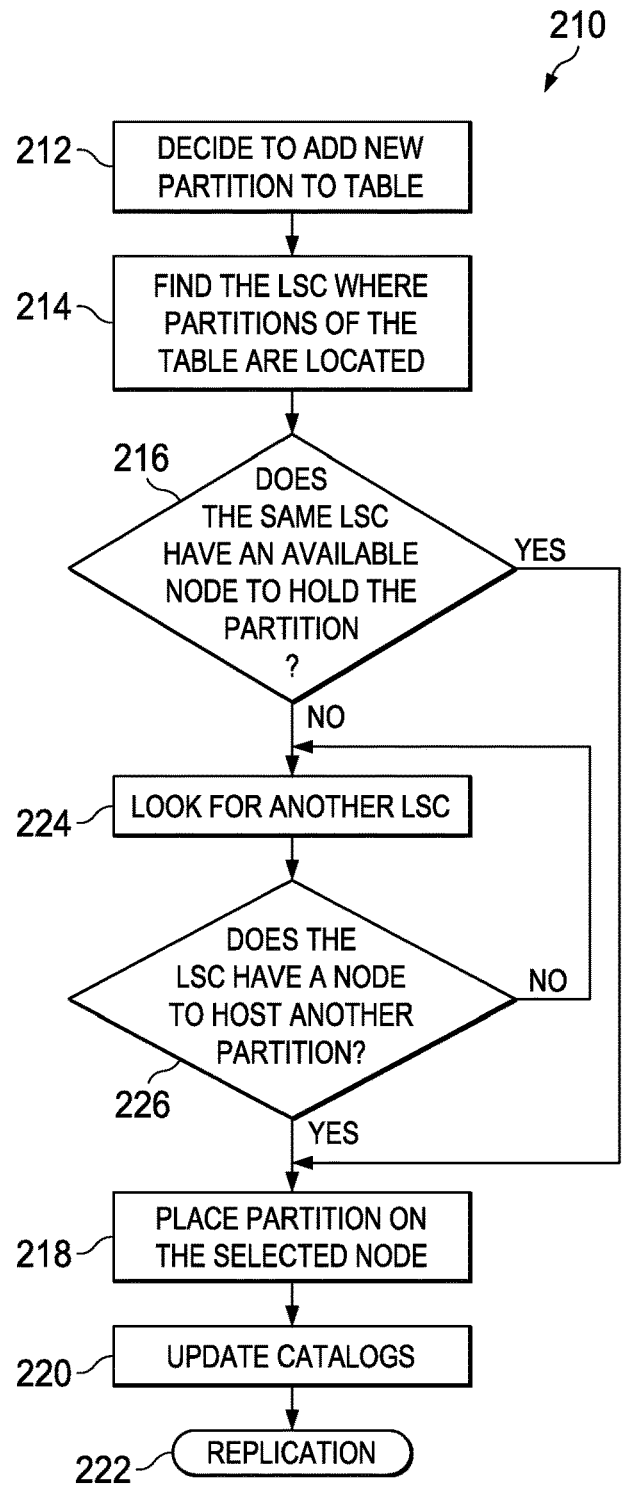
FIG. 5 illustrates a flowchart for an embodiment method of adding a new partition to a table in an MPP database.

FIG. 5 illustrates flowchart 210 for a method of adding a new partition to an existing table. Initially, in step 212, the system decides to add a new partition to the table.

Next, in step 214, the system determines the LSC on which existing partitions of the table are located.

Then, in step 216, the system determines whether that LSC has an available node with sufficient resources to hold the new partition. When the LCS does not have an available node with sufficient resources, the system proceeds to step 224. When the LCS has an available node with sufficient resources, the system proceeds to step 218.

In step 218, the system places partition on the available node in the LSC.

Next, in step 220, the system updates the catalogs to indicate that the partition is on the node in the LSC.

Finally, the system performs replication for the partition in step 222, for example using the method illustrated by flowchart 160. The same data is stored on different nodes for consistency between redundant resources. The other node may be in the same LSC or another LSC in the same MSC, based on whether synchronous replication, asynchronous replication, or semi-synchronous replication. In synchronous replication, replicas are placed on other nodes of the same LSC, while in asynchronous replication, replicas are placed on nodes of different LSC(s). In semi-synchronous replication, some replicas are placed on nodes of the same LSC while other replicas are placed on nodes of other LSC(s).

In step 224, the system looks for another LSC with an available node with sufficient resources for the partition. The system moves up a level, and looks for another LSC in the same MSC. Another LSC is selected.

Then, in step 226, the system determines whether the LSC has an available node with sufficient resources to host the partition. When the LSC has an available node with sufficient resources to host the partition, the system proceeds to step 218 to create a partition on the available node. When the LSC does not have such an available node, the system returns to step 224 to look for another LSC in the same MSC.

Figure 6:
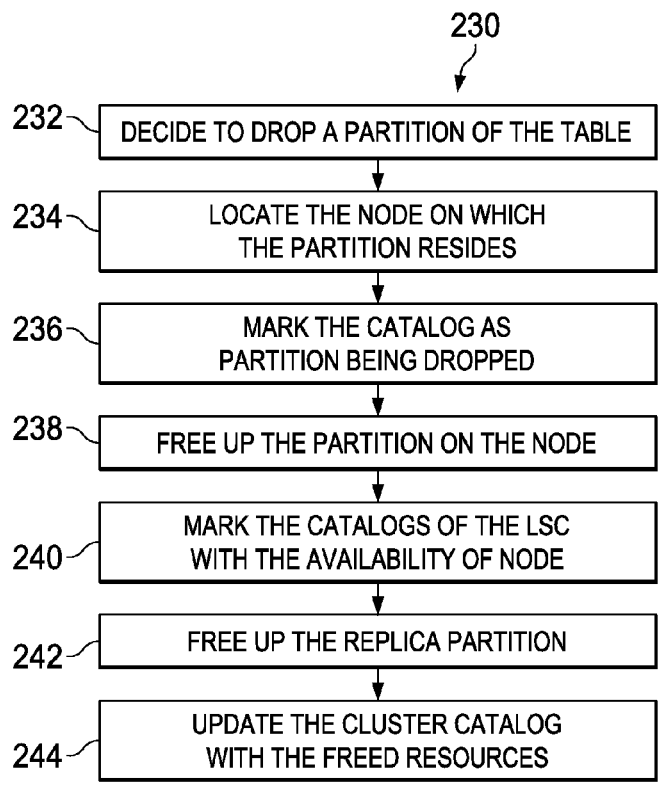
FIG. 6 illustrates a flowchart for an embodiment method of dropping a partition from a table in an MPP database.

FIG. 6 illustrates flowchart 230 for a method of dropping a partition. Initially, in step 232, the system decides to drop a partition of a table.

Next, in step 234, the system locates the node on which the partition to be dropped resides.

Then, in step 236, the system marks the partition as being dropped in the cluster catalog. The replicas use the cluster catalog to determine the cluster to take over nodes, and places the replicas of the partitions based on the catalog.

In step 238, the system frees up the partition on the node.

After the node is freed, the system marks the catalogs of the LSC with the availability of the node in step 240.

Next, in step 242, the system frees up the replica partition corresponding to the partition being removed. The replica is on another node, either on the same LSC or another LSC in the same MSC.

Finally, in step 244, the system updates the cluster catalog with the freed resources. Then, the resources are available for other uses.

Figure 7:
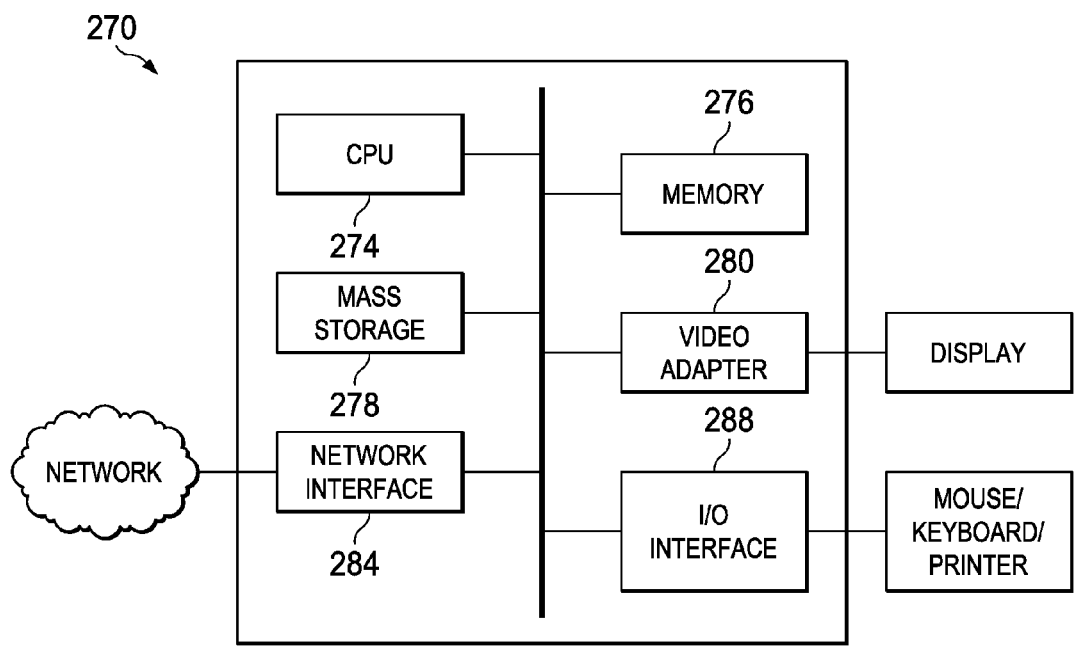
FIG. 7 illustrates a block diagram of an embodiment computer system.

FIG. 7 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adaptor 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for adding partitions to a massively parallel processing (MPP) database, the method comprising:
   determining, from among a plurality of leaf sub-clusters (LSCs) of a meta sub-cluster (MSC) of the MPP database, that a first number of available nodes of a first LSC of the MSC of the MPP database is greater than or equal to a number of partitions of a first table, the first table comprising a plurality of partitions such that the number of partitions of the first table is greater than one, the MPP database having at least a two-layer hierarchical structure in which the MSC is in a higher layer than and is a connector node for the plurality of LSCs, at least two LSCs of the plurality of LSCs comprising a plurality of nodes, the first LSC being one of the at least two LSCs and comprising the available nodes of the first number of available nodes;
   assigning, based at least in part on determining that the first number of available nodes of the first LSC of the MSC of the MPP database is greater than or equal to the number of partitions of the first table, a first node of the first LSC to a first partition of the first table and a second node of the first LSC to a second partition of the first table;

determining whether there is a foreign key relationship between the first table and a previously created table, the previously created table being on the first LSC; and determining that the first number of available nodes of the first LSC is greater than or equal to the number of partitions of the first table is performed based at least in part on determining that there is not a foreign key relationship between the first table and the previously created table.

2. The method of claim 1, wherein determining that the first number of available nodes of the first LSC is greater than or equal to the number of partitions of the first table is performed based at least in part on determining that a table corresponding to the first partition is on the first LSC.

3. The method of claim 1, further comprising updating a catalog to indicate that the first partition is on the first node.

4. The method of claim 1, further comprising replicating a plurality of partitions of the first table.

5. The method of claim 1, further comprising:
determining that a second number of available nodes of the first LSC of the MSC of the MPP database is less than a number of partitions of a second table;
determining, based at least in part on determining that the second number of available nodes of the first LSC is less than the number of partitions of the second table, that the first node of the first LSC has sufficient resources for the number of partitions of the second table; and
assigning, based at least in part on determining that the first node of the first LSC has sufficient resources for the number of partitions of the second table, the number of partitions of the second table to the first node.

6. The method of claim 1, further comprising:
determining that a second number of available nodes of the first LSC of the MSC of the MPP cluster is less than a number of partitions of a second table; and
searching, based at least in part on determining that the second number of available nodes of the first LSC of the MSC of the MPP database is less than a number of partitions of the second table, for a second LSC in the MSC that has a number of available nodes greater than or equal to the number of partitions of the first table.

7. The method of claim 6, wherein the first number of available nodes of the first LSC and the second number of available nodes of the first LSC are a same number.

8. The method of claim 6, wherein the first table and the second table are the same table.

9. The method of claim 1, further comprising assigning a node of the first LSC other than the first node of the first LSC to storing a replica of the first partition of the first table.

10. The method of claim 1, further comprising assigning a node of a second LSC of the plurality of LSCs of the MSC to storing a replica of the first partition of the first table.

11. The method of claim 1, further comprising:
determining that there is a foreign key relationship between a second table and a previously created table, the previously created table being on the first LSC;
determining, in response to determining that there is a foreign key relationship between the second table and the previously created table, whether there are sufficient resources and load balancing rules on the first LSC; and
searching, in response to determining that there are not sufficient resources and load balancing rules on the first LSC, for another LSC with a minimum distance from the first LSC for potential assignment of partitions of the second table.

12. The method of claim 1, further comprising assigning the first node of the first LSC to storing a partition of a second table such that the first node of the first LSC is assigned to store the first partition of the first table and the partition of the second table.

13. A computer comprising:
a processor; and
a non-transitory computer-readable storage medium storing programming for execution by the processor, the programming configured to, when executed by the processor, cause the processor to perform operations comprising:
determining, from among a plurality of leaf sub-clusters (LSCs) of a meta sub-cluster (MSC) of a massively parallel processing (MPP) database, whether a first number of available nodes of a first LSC of the MSC of the MPP database is greater than or equal to a number of partitions of a first table, the first table comprising a plurality of partitions such that the number of partitions of the first table is greater than one, the MPP database having at least a two-layer hierarchical structure in which the MSC is in a higher layer than and is a connector node for the plurality of LSCs, at least two LSCs of the plurality of LSCs comprising a plurality of nodes, the first LSC being one of the at least two LSCs and comprising the available nodes of the first number of available nodes;
assigning, based at least in part on determining that the first number of available nodes of the first LSC of the MSC of the MPP database is greater than or equal to the number of partitions of the first table, a first node of the first LSC to a first partition of the first table and a second node of the first LSC to a second partition of the first table;
searching, based at least in part on determining that the first number of available nodes of the first LSC of the MSC of the MPP database is less than the number of partitions of the first table, for a second LSC of the MSC that has a number of available nodes greater than or equal to the number of partitions of the first table;
determining whether there is a foreign key relationship between the first table and a previously created table, the previously created table being on the first LSC; and
determining whether the first number of available nodes of the first LSC is greater than or equal to the number of partitions of the first table is performed based at least in part on determining that there is not a foreign key relationship between the first table and the previously created table.

14. The computer of claim 13, wherein determining whether the first number of available nodes of the first LSC is greater than or equal to the number of partitions of the first table is performed based at least in part on determining that a table corresponding to the first partition is on the first LSC.

15. The computer of claim 13, wherein the operations further comprise: updating a catalog to indicate that the first partition is on the first node.

16. The computer of claim 13, wherein the operations further comprise: replicating a plurality of partitions of the first table.

17. The computer of claim 13, wherein the operations further comprise:
determining whether the first node of the first LSC has sufficient resources for the number of partitions of the first table; and
assigning the number of partitions to the first node when the first node has sufficient resources for the number of partitions, wherein the search for the second LSC is performed when the first node does not have sufficient resources for the number of partitions.

18. A computer program product comprising a non-transitory computer-readable storage medium storing programming, the programming configured to, when executed by a processor, cause the processor to perform operations comprising:

determining, from among a plurality of leaf sub-clusters (LSCs) of a meta sub-cluster (MSC) of a massively parallel processing (MPP) database, whether a first number of available nodes of a first LSC of the MSC of the MPP database is greater than or equal to a number of partitions of a first table, the first table comprising a plurality of partitions such that the number of partitions of the first table is greater than one, the MPP database having at least a two-layer hierarchical structure in which the MSC is in a higher layer than and is a connector node for the plurality of LSCs, at least two LSCs of the plurality of LSCs comprising a plurality of nodes, the first LSC being one of the at least two LSCs and comprising the available nodes of the first number of available nodes;

assigning, based at least in part on determining that the first number of available nodes of the first LSC of the MSC of the MPP database is greater than or equal to the number of partitions of the first table, a first node of the first LSC to a first partition of the first table and a second node of the first LSC to a second partition of the first table;

searching, based at least in part on determining that the first number of available nodes of the first LSC of the MSC of the MPP databased is less than the number of partitions of the first table, for a second LSC of the MSC that has a number of available nodes greater than or equal to the number of partitions of the first table;

determining whether there is a foreign key relationship between the first table and a previously created table, the previously created table being on the first LSC; and determining whether the first number of available nodes of the first LSC is greater than or equal to the number of partitions of the first table is performed based at least in part on determining that there is not a foreign key relationship between the first table and the previously created table.

19. The computer program product of claim 18, wherein determining whether the first number of available nodes of the first LSC is greater than or equal to the number of partitions of the first table is performed based at least in part on determining that a table corresponding to the first partition is on the first LSC.

20. The computer program product of claim 18, wherein the operations further comprise:

determining whether the first node of the first LSC has sufficient resources for the number of partitions of the first table; and assigning the number of partitions to the first node when the first node has sufficient resources for the number of partitions, wherein the search for the second LSC is performed when the first node does not have sufficient resources for the number of partitions.

* * * * *